United States Patent [19]

Lincoln

[11] 4,156,537
[45] May 29, 1979

[54] OPERATOR'S CAB FOR DRILL RIG

[76] Inventor: Paul A. Lincoln, Rte. 1, Box 399, Clarksburg, W. Va. 26301

[21] Appl. No.: 754,078

[22] Filed: Dec. 23, 1976

[51] Int. Cl.² .............................................. B62D 27/00
[52] U.S. Cl. ..................................... 296/190; 49/463; 180/89.12
[58] Field of Search ........................... 296/28 R, 28 C; 180/89.12, 89.13, 89.14, 89.15; 49/382, 463

[56] References Cited
U.S. PATENT DOCUMENTS

| | | | |
|---|---|---|---|
| 1,944,429 | 1/1934 | Hartry | 296/28 C |
| 3,963,132 | 6/1976 | Dufour | 296/28 C |

FOREIGN PATENT DOCUMENTS 501262 7/1930 Fed. Rep. of Germany ........ 296/28 C

Primary Examiner—Joseph F. Peters, Jr.
Assistant Examiner—John A. Carroll

[57] ABSTRACT

An operator's cab for mobile earthworking machines such as drilling rigs, cranes and the like has interchangeable cab doors. One of the doors is flat or planar to reduce the exterior dimensions while the other is expanded or bulged to provide greater interior cab space when operating conditions permit. A hydraulic interlock system restricts certain machine operations when the bulged door is positioned to interfere with movement of other parts of the earthmoving machine.

7 Claims, 5 Drawing Figures

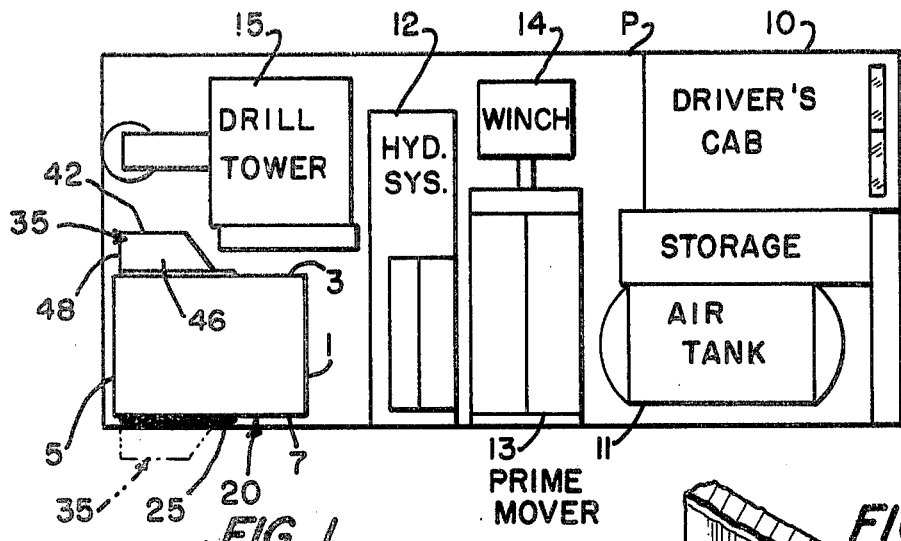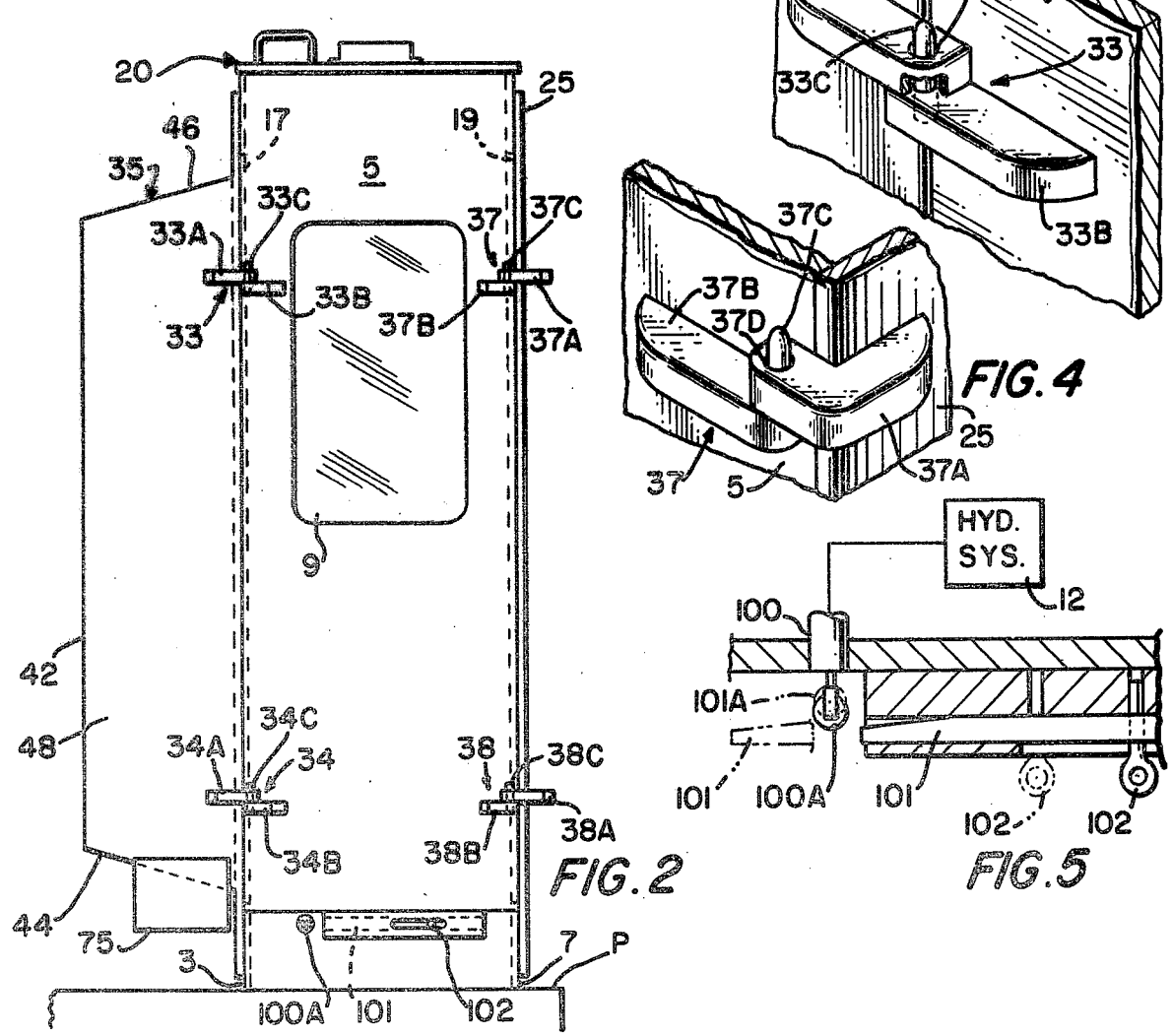

OPERATOR'S CAB FOR DRILL RIG

In recent years a decided trend has developed in the design of earthworking equipment toward compact, completely mobile machines capable of being moved from one side to another either as units self-propelled or transported on trailers via public highway. Such equipment may range from the usual and well-known backhoes and scoop loaders through heavy duty cranes and earth boring machines capable of performing massive earthworking operations. It is with this last type of earthworking machines that certain transport problems have arisen due to the enactment of strict State and Federal regulations restricting such physical characteristics as weight, width and length of objects that may legally employ public highways during movement from place to place. The standardized acceptable legal width for movement on public highways has been set at eight feet and any deviation from this standard requires the grant of special permits having specific requirements as to time of movement, accessibility to highways, and escort vehicles. Also, considerable sums for special license fees and overtime wages must be paid where movements of equipment are restricted to "off" hours or night time hours.

To meet the standards required for easy mobility of heavy duty earthworking equipment much engineering effort has been directed toward the development of extremely compact, heavy duty working machines conforming in various characteristics, including length, width and weight, to the standards set by Federal and State regulations for over-the-road mobility. However, some engineering considerations positively determine limitations on the dimensions of various components essential to the function of the particular earthworking equipment and servicing considerations determine the placement of such components on the mobile support or chassis.

A prime example of heavy duty earthworking equipment engineered to perform very heavy duty functions yet be completely mobile is the earth drilling rig. These drilling rigs are massive pieces of equipment having a complex wheeled chassis carrying, among other components, a power source, i.e. a high horsepower internal combustion engine, an air compressor, compressed air storage tanks, a hydraulic pump and storage system, control valves and various conduits for both air and hydraulic systems, a pivotally mounted, extensible drill tower of massive proportion and weight incorporating drill handling instrumentalities, mechanical tower extension and retraction means, and an operator's cab located adjacent the work performing end of the chassis, typically the rear end of the chassis or wheeled platform.

Due to the functional requirements necessary to enable this rig to perform its intended operation about the only component susceptible of modification or improvement to facilitate compliance of such a rig to the width standards for highway movement is the operator's cab which must be positioned to provide the operator with full view of the earthworking operation, must not interfere with the operating versatility of the machine, yet must provide ample room and protection for the comfort, convenience and safety of the operator.

It will be appreciated, of course, that the same considerations dealt with in connection with drilling rigs of the type described may also apply to other types of earthworking equipment. Hence, reference to this particular equipment is by way of illustration and example only, since the principles of the inventive concept are not limited to any particular form of earthworking apparatus. For example, U.S. Pat. No. 3,431,016 issued Mar. 4, 1969 to J. H. Mundt-Petersen et al illustrates one aspect of dealing with a related dimensional problem and its solution by the provision of a uniquely designed and platform anchored operator's cab.

The invention relates to improvements in operator's cabs for earthworking machines, or the like, where profile dimensions are a major consideration and, in particular, deals with the problem of reducing the width of such a cab for certain functions while still providing operator convenience, comfort and protection in several selective configurations for certain other functions of the machine upon which it is located.

The description broadly describes an operator's cab of fixed, generally cubiform shape mounted on the chassis or platform of an earthworking machine in the available space dictated by the location of its functional components that has at least one window at its front or working face and access openings in its sides. The openings are accessible through a pair of hinged, pivotally swingable and removable doors mounted on pintles. One of the doors has a lateral, windowed box-like bulge and each of the doors has a latch. A control means is mounted on the frame for disabling operation of certain functional components of the earthworking machine when the bulging door is in an interfering position.

Numerous advantages and objects will be apparent to those skilled in the art from the following description in which reference is made to the drawings.

FIG. 1 is a schematic plan view of a typical earthworking device embodying the invention and showing the location of various components thereof;

FIG. 2 is a front view of the cab shown in FIG. 1;

FIG. 3 is a perspective view of a hinge assembly shown in FIG. 2;

FIG. 4 is a perspective view of another hinge assembly shown in FIG. 2;

FIG. 5 is a partial sectional view of the bypass element shown in FIG. 2 and a schematic of a hydraulic safety system for controlling operation of functional components shown in FIG. 1.

FIG. 1 shows a type of mobile earthworking apparatus to which an embodiment of the invention is applied with considerable advantage. This apparatus comprises a platform P mounted on wheels (not shown) and is capable of traveling either on or off the road. The wheels, as is conventional in the art, are power driven and steerable. In order to faciliate mobility of the unit, platform P is of a length and width complying with most Federal and State laws regulating such dimensions for vehicles traveling public roads. The width restriction presently is eight feet for vehicles that move on public roads without special permits.

Because of width restriction, the components of the drilling rig must not project beyond the edges of platform P, at least during movement on public roads. Thus, the available space on platform P is limited and considerable ingenuity must be exercised to place the massive operating components. Accordingly the platform dimensions are selected to meet functional and space requirements and to carry the functional components of the apparatus. Provision must be made for a driver's cab 10, high pressure air tank 11, hydraulic system 12, power source 13, winch 14 and pivotal drill tower 15, the last being pivoted on said platform for swinging from vertical to horizontal and vice versa. Finally, after all of the functional components are assembled on platform P, provision must be made for placing the drilling operator at a location to operate and observe the operation of the rig in safety and with protection from the elements. In this particular rig, the necessary location for the operator's cab is at the rear of platform P adjacent and to one side of the drill tower where space is at a premium so that if the cab was wide enough to be completely convenient to the operator, its width would be such as to overhang the edge of platform P or, alternatively, to interfere with operation of a functional component of the rig, particularly drill tower 15.

Referring to FIGS. 1 and 2, an operator's cab 20 of limited dimensions selected to not interfere with the operation of the apparatus comprises a cubiform vertically elongated box-like structure constructed of high strength protective material such as steel plate and related structural elements having a front wall 5, a curb or outer side wall 7, a tower or inner side wall 3, and a back wall 1.

Back wall 1 may be provided with a windowed area but most generally is all metal for enhanced operator protection. Front wall 5 has an observation window 9 while curb side wall 7 and tower side wall 3 have windows (not shown) as desired. The sides of the cab have access openings 17 and 19 with opening 17 in tower side wall 3 and opening 19 in curb side wall 7.

Cab 20 is considerably higher in dimension than in either length or width with the width dimension being on the order of ⅓ less than the length dimension. The length of cab 20 from back wall 1 to front wall 5 is typically approximately 60 inches overall, while the width between the side walls is typically 23 inches, while the overall height of the cab is typically about 75 inches.

Considering that the average width of an operator's shoulders is about 17 to 19 inches, it is apparent that, at best, cab 20 provides marginal room for comfort and convenience. Added to this is the fact that, within the interior of the cab, an operator's seat (not shown) is placed adjacent back wall 1 and a control panel (not shown) containing all of the operator's controls for operation of the drilling machine is placed adjacent front wall 5. The narrowness of the cab is a matter of concern since the mobility of the operator is drastically restricted, particularly since the cab should be completely closed to protect the operator from the elements and to isolate him from the noise.

Referring to FIGS. 1 through 4, access openings 17 and 19 are covered or closed by a pair of horizontally swingable doors 25 and 35. Door 25 is a planar closure having windows (not shown) as desired and door 35 is a door having an outwardly extending bulging surface to substantially increase the interior volume of the cab. A means for mounting the doors to open and close over the openings in an upright position on one opening and an inverted position on the other opening comprises hinge assemblies 33 and 34 on one side and 37 and 38 on the other. Each hinge assembly respectively comprises a pair of hinge leaves 33A and 33B, 34A and 34B, 37A and 37B, and 38A and 38B as shown. Each has one leaf affixed to the door and the other leaf affixed to front wall 5, with hinge leaves 33B, 34B, 37B and 38B having upwardly extending pins 33C, 34C, 37C and 38C, respectively. Hinge leaves 33A, 34A, 37A and 38A have openings adapted to receive hinge pins 33C, 34C, 37C and 38C, respectively, shown in FIGS. 3 and 4 as openings 33D and 37D for hinge assemblies 33 and 37, respectively. This hinge structure is of a type known and may be affixed to doors 25 and to the front wall or side wall by any suitable means.

It will be noted that the vertical spacing of the hinge leaves 33A and 34A on door 35 and leaves 37A and 38A on door 25 are symmetrical, that is, the distance from the bottom of the door to the bottom hinge leaf is the same as the vertical distance from the top of the door to the upper hinge leaf, so that the doors may be interchanged by simply inverting them when changing sides.

While the marginal areas of door 25 are similar to the marginal edges of door 35, the innermost area of door 35 has an outwardly extending bulge made of an outer panel 42 mounted on the door by means of outwardly extending extension panels 44, 46, 48 and the back panel (not shown). Extension panels 44 and 46 slope somewhat upwardly and downwardly respectively while rear extension panel may be slanted somewhat forwardly. Front panel 48, however, extends out from the plane of door 35 generally perpendicular thereto. The panels combine typically to form an outwardly extending bulge of approximately 13 inches in width and 57 inches in height, while panel 42 is approximately 22 inches in the fore and aft direction as shown in FIG. 3. Thus, the overall space within cab 20 is increased approximately ¼ by the bulge. The extension panels as well as outer bulge panel 42 may have windows (not shown) as desired.

Referring now to FIG. 5 in conjunction with FIG. 2, a control means for disabling the operation of a selected functional component, such as drill tower 15, comprises a hydraulic safety lock arrangement that acts in conjunction with door 35 when mounted on drill side wall 3. The lock arrangement comprises a control valve 100 having a roller actuator 100A that is depressed by a manually operated slide bar 101 that is locked in place with a lock pin 102. Bar 101 is placed in the phantom position shown in FIG. 5 to depress actuator 100A which acts on the hydraulic system in any manner known in the art to enable the operation of the drill tower or other functional component that would be interfered with by door 35 in the inner side wall position. When bulging door 35 is placed on inner side wall 3 in the position shown, bar 101 is moved to the position shown and valve 100 is actuated to control hydraulic system 12 in any manner known and prevent interfering type operation of the drill tower with the door.

In the operation of the rig, cab 20 may use either "bulging door" 35 or door 25 on the curb side (as shown in phantom in FIG. 1) or tower side of cab 20.

Interference of the door can also be eliminated by swinging the "bulging" door 35 to an open position wherein it pivots about pins 33C and 34C to a position where it is substantially aligned with the tower side. To permit full operation when door 35 is fully open, a by-pass means for inactivating the control means when door 35 is fully open comprises a plate 75 extending down from door 35 in a position to engage valve actuator 100A when the door is fully open. As door 35 is swung open 180° to be in the same plane as the tower side of cab 20, it depresses valve actuator 100A and thereby functions in the same manner as bar 101. Thus, unless door 25 is properly opened, there can be no operation of the tower or boom of the machine.

If doors 25 and 35 have been interchanged in the manner described above, i.e., inverted with door 35 placed on curb side 7 of cab 20 and flat door 25 placed on tower side 3 of cab 20, to make the tower control operable under this arrangement, latch bar assembly is slidably moved in a longitudinal direction. As shown in FIG. 5, when latch bar 101 is moved toward the left, it will engage and depress operator 100A to close this valve and override the disabling means.

Having described the invention and its operation in detail, it will become apparent that various changes and modifications will occur to those skilled in the art, all of which fall within the spirit and scope of the following claims which define the inventive concept.

I claim:

1. An operator's cab for earthworking devices having an enclosed cubiform box-like structure with a back wall, a front wall, and a top, and further comprising:
   a pair of side walls with operator access openings;
   a pair of doors adapted to cover said access openings;
   a means for mounting said doors to open and close over said access openings in an upright position on one access opening and in an inverted position on the other access opening; and
   at least one of said doors having an outwardly bulging surface.

2. An operator's cab according to claim 1 wherein said means for mounting comprises a hinge assembly attached to each door and to one of said walls adjacent each access opening with said hinge assembly positioned and adapted to receive and hold said doors in an upright position on one access opening and in an inverted position on the other access opening.

3. An operator's cab according to claim 2 wherein said doors and said access openings have cooperatively positioned front edges and rear edges, and said hinge assemblies each comprise a door hinge leaf mounted adjacent an edge of each respective door and a wall hinge leaf attached to said cab adjacent each front edge of each respective access opening; and wherein said door hinges and wall hinges are positioned and adapted to receive the doors in the respective upright and inverted positions.

4. A mobile earthworking apparatus having a platform of dimensions selected to receive and carry the functional components of the apparatus, an operator's cab of limited dimensions selected to not interfere with the operation of said apparatus, and a functional component mounted closely adjacent an inner side of said cab, wherein said cab comprises:
   a front wall, a rear wall, a top, an inner side wall, and an outer side wall with said side walls each having operator access openings;
   a pair of doors adapted to cover said access openings;
   at least one of said doors having an outwardly extending bulge to substantially increase the interior volume of said cab; and
   a means for mounting said doors on said side walls to pivotally move about an axis and to receive doors at one access opening in an upright position and at the other access opening in an inverted position.

5. An apparatus according to claim 4 also comprising a control means for disabling the operation of said functional component.

6. An apparatus according to claim 5 wherein said control means comprises a by-pass means responsive to positioning of said bulged door in an opened position when mounted on the inner side for inactivating the control means to thereby permit operation of said functioning device.

7. An apparatus according to claim 4 wherein said access openings each have a generally vertical front edge adjacent the front wall and a generally vertical rear edge adjacent the rear wall; said axis is a generally vertical axis positioned respectively adjacent each of said front edges of said access openings; and the means for mounting comprises a door hinge connected to each door adjacent the front edge of said door and a wall hinge adapted to cooperatively engage the door hinge connected to said cab adjacent each front edge of each of said access openings with said hinges positioned and adapted to receive said doors at one access opening in an upright position and at the other access opening in an inverted position.

* * * * *

UNITED STATES PATENT AND TRADEMARK OFFICE
CERTIFICATE OF CORRECTION

PATENT NO. : 4,156,537
DATED : May 29, 1979
INVENTOR(S) : Paul A. Lincoln

It is certified that error appears in the above-identified patent and that said Letters Patent are hereby corrected as shown below:

Column 5, line 40, "hinges" (both occurrences) should read
--- hinge leaf ---.

Column 6, lines 26-27, "functioning device" should read
--- functional component ---.

Signed and Sealed this

Twenty-fifth Day of September 1979

[SEAL]

Attest:

LUTRELLE F. PARKER
Attesting Officer    Acting Commissioner of Patents and Trademarks